United States Patent

[11] 3,532,068

[72] Inventor Alan S. Lamburn,
 Kencott, Via Lechlade, Gloucestershire, England
[21] Appl. No. 721,825
[22] Filed Apr. 16, 1968
[45] Patented Oct. 6, 1970
[73] Assignee By mesne assignments, to
 Axel Charles Wickman,
 Sarasota, Fla.
[32] Priority Apr. 19, 1967
[33] Great Britain
[31] 17,907/67

[54] PROPULSION OF A BOAT
 12 Claims, 4 Drawing Figs.
[52] U.S. Cl. .................................................. 115/34
[51] Int. Cl. .................................................. B63h 1/14
[50] Field of Search .......................................... 115/34, 35;
 114/66.5, 66.5(S); 74/781

[56] References Cited
UNITED STATES PATENTS
1,608,471 11/1926 Lascombes .................... 115/34X
2,656,814 10/1953 Kiekhaefer ................ 114/66.5(S)UX
3,164,036 1/1965 Lamburn et al. ............. 74/781

Primary Examiner—Trygve M. Blix
Attorney—Holman, Glascock, Downing and Seebold

ABSTRACT: In a boat hull requiring less propulsive power at minimum planing speed than is required at a lower speed, a propulsion system comprises a change-speed gearing arranged between the engine and the propeller. The gearing provides a lower forward drive ratio to be engaged at sub-planing speed whereby full engine power can be used to accelerate the hull to planing speed, and a higher forward drive ratio to be engaged at planing speed whereby the hull can be maintained at planing speed with reduced engine speed and power output.

Patented Oct. 6, 1970

INVENTOR:-
ALAN SALISBURY LAMBURN
BY:- Glascock, Downing & Seebold.
ATTORNEY

PROPULSION OF A BOAT

This invention relates to the propulsion of a boat and is specifically concerned with the propulsion of a boat having a hull which will plane along the water when a predetermined relative speed between the hull and the water is achieved.

The total drag coefficient of a boat hull, that is the sum of the form and friction drag coefficients, is substantially lower when the boat is planing than when the boat is below the minimum planing speed and is consequently deeper in the water. Although the total drag force applied to a boat hull increases as a function of the relative speed between the hull and the water, some boat hulls have a total drag coefficient whilst planing which is sufficiently lower than the total drag coefficient before planing takes place so that less power is required to propel the hull at its minimum planing speed than is required to propel the hull at a lower speed.

According to the invention a propulsion system, for a boat hull of the kind which requires less propulsive power at its minimum planing speed than is required at a lower speed, includes a change-speed gearing arranged between a prime mover and a propeller to provide two alternative forward drive ratios between the prime mover and the propeller, the lower forward ratio being for engagement at sub-planing speeds whereby the prime mover can apply optimum power to the propeller for accelerating the hull to at least its minimum planing speed, and the higher forward ratio being for engagement when the hull has achieved a planing speed whereby the prime mover can be operated at reduced rotational speed and reduced power output whilst still driving the propeller at a sufficient rotational speed to maintain the hull at a planing speed. Preferably, the change-speed gearing provides a power gear change from the lower forward ratio to the higher forward ratio whereby there will be no interruption in the transmission of power from the prime mover to the propeller.

The change-speed gearing is preferably an overdrive epicyclic gearing which provides a direct ratio constituting said lower forward ratio, and an overdrive epicyclic ratio constituting said higher forward ratio. In this case, provided that no reduction gearing is arranged between the change-speed gearing and either the prime mover or the propeller, the full prime move torque would be applied to the propeller at sub-planing speeds, and the gear change into the epicyclic overdrive ratio would, if the rotational speed of the prime mover remained constant, reduce the torque applied to the propeller but would also increase the propeller speed by an equivalent amount — on the other hand, if a conventional marine reduction gearing were present, similar conditions would exist except that the torque applied to the propeller would be multiplied by the ratio of the reduction gearing. By appropriately selecting the epicyclic overdrive ratio, the torque-speed characteristic applied to the propeller at planing speeds can be arranged to match the drag speed characteristics of the hull at planing speeds without effecting the corresponding characteristics at sub-planing speeds. It will be appreciated that the overdrive ratio enables the hull to be driven more economically at planing speeds as the rotational speed of the prime mover will be lower with consequent fuel savings, lower wear, and a reduction in the noise level. Furthermore, under some circumstances, the overdrive ratio enables the hull to be driven at a higher planing speed by more closely matching the maximum power of the prime mover and the speed of the propeller to the drag speed characteristic of the hull. Also, if the prime mover is capable of accelerating the hull to a planing speed when the overdrive ratio is engaged, the engagement of the direct ratio will increase the acceleration of the hull to the planing speed. It will also be appreciated that a power gear change from the direct ratio to the overdrive ratio enables a smooth transition of drive ratio to occur without interrupting the application of propulsion to the hull.

Alternatively the change-speed gearing could be an underdrive epicyclic gearing which provides an underdrive epicyclic ratio constituting said lower forward ratio, and a direct drive ratio constituting said higher forward ratio. In this case, provided that no reduction gearing is arranged between the change-speed gearing and either the prime mover or the propeller, the full prime mover torque multiplied by the underdrive ratio would be applied to the propeller at sub-planing speeds, and the gear change into the direct drive ratio would, if the rotational speed of the prime mover remained constant, reduce the torque applied to the propeller to full prime mover torque but would also increase the propeller speed by an equivalent amount —on the other hand, if a conventional marine reduction gearing were present, similar conditions would exist except that the torque applied to the propeller would be multiplied by the ratio of the reduction gearing. Under these circumstances the torque-speed characteristic of the prime mover can be matched with the drag speed characteristic of the hull at planing speeds, and the underdrive ratio will enable higher torque to be applied to the propeller at sub-planing speeds. Also, if the prime mover is capable of accelerating the hull to a planing speed when the direct drive ratio is engaged, the engagement of the underdrive ratio will increase the acceleration of the hull to the planing speed. Alternatively the hull could be powered by a smaller engine than usual, the power output of the engine being determined by the lower power requirement to maintain a planing speed rather than the higher power requirement which is required to accelerate the hull to a planing speed —the underdrive ratio would serve to increase the torque applied to the propeller. A power gear change from the underdrive ratio to the direct drive ratio enables a smooth transition of drive ratio to occur without interrupting the application of propulsion to the hull.

If desired, the change-speed gearing could also include a reverse drive ratio to enable the hull to be manoeuvred at sub-planing speeds. The propulsion system may comprise an outboard boat propulsion unit incorporating the prime mover together with the propeller and the change-speed gearing, and a casing for the change-speed gearing is secured to a casing of the prime mover and a casing supporting said propeller. Alternatively the propulsion system may comprise a stern-drive boat propulsion unit incorporating the prime mover together with the propeller and the change-speed gearing, and a casing for the change-speed gearing is secured to a casing of the prime mover and a casing supporting said propeller.

The invention is now described, by way of example only, with reference to the accompanying drawings, in which.

Figure 1:
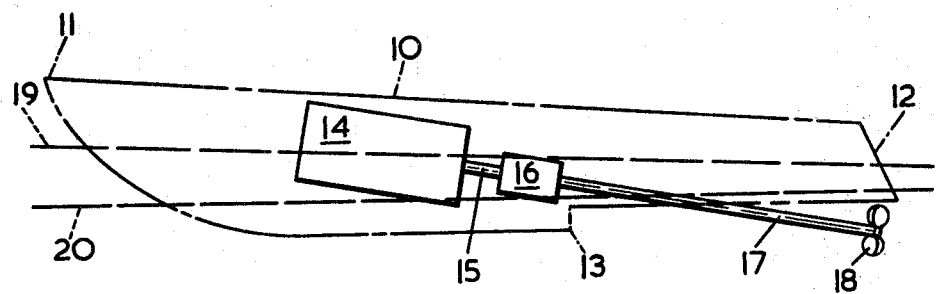
FIG. 1 is a side elevational diagram of a boat hull and the means for driving it.

As shown in FIG. 1, a boat hull is indicated by the chain dotted line 10 and defines a bow 11, a transom stern 12 and a step 13. The hull carries a prime mover 14 which is connected by a driveshaft 15 to drive an epicyclic overdrive gearing 16 having its power output connected to drive a propeller shaft 17 extending through the bottom of the boat for driving a propeller 18 in a manner well-known in the art. The boat hull and the propeller drive are conventional with the exception of the overdrive gearing 16. The latter is preferably of the type commonly used in motor vehicles and may, for instance, be of the kind already disclosed in one of U.S. Pat. Specifications Nos. 3,182,528, filed 24th May, 1962 and 3,164,036, filed 9th May, 1963. However, the gearing preferably provides a power gear-change from the lower to the higher ratio. Nevertheless, the gearing could be of the dog-engaged type taught in our U.S. Applications Nos. 597,463 now U.S. Pat. No. 3,426,623 and 644,913, now U.S. Pat. No. 3,459,285.

Figure 4:
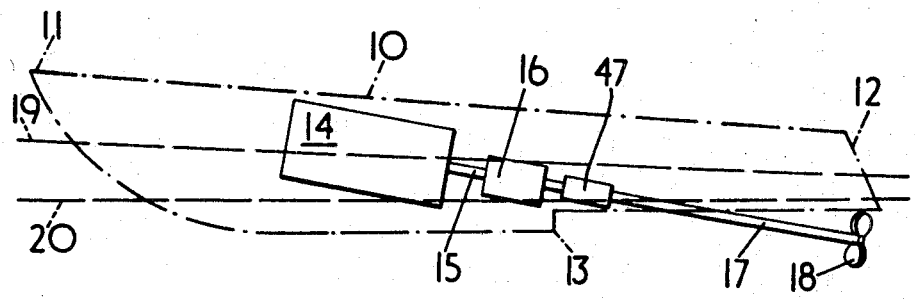
FIG. 4 is a side elevation similar to that of FIG. 1 and shows a reversing device incorporated with an outboard boat propulsion unit.

As previously stated, an underdrive epicyclic gearing or other suitable change-speed gearing could be used and, if desired, a reverse drive device 47 providing an optionally engageable reverse drive ratio may also be incorporated as illustrated in FIG. 4.

The line 19 indicates the normal water level relative to the hull 10 and it will be appreciated that as the speed of the hull increases it will lift progressively out of the water due to the functioning of the step 13 until the water level is as indicated by the line 20 and the hull is then in a planing condition. The form drag coefficient and the friction drag coefficient decrease as the water line drops from line 19 to line 20 and the hull requires less propulsive power to maintain its lowest planing speed than is required to accelerate the hull to this speed.

If desired a conventional marine reduction or multiplication gearing may be arranged either between the prime mover 14 and the change-speed gearing 16, or between the latter and the propeller 18.

Figure 2:
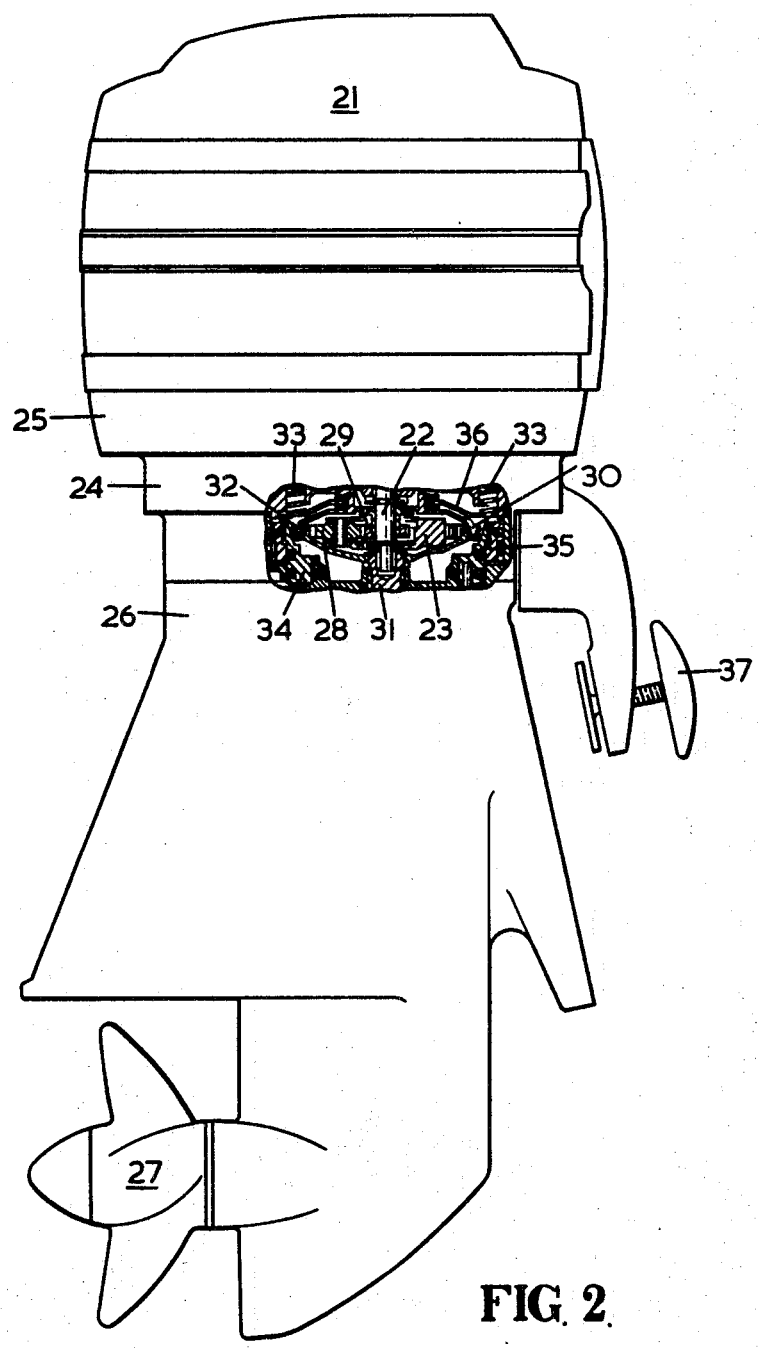
FIG. 2 is a side elevation, shown partly in section, of an outboard boat propulsion unit.

In the embodiment illustrated in FIG. 2, an outboard boat propulsion unit comprises a prime mover 21 having a vertical power output shaft 22 arranged to drive a planet carrier 23 of an overdrive epicyclic gearing which is arranged in a casing 24 secured to a casing 25 of the prime mover 21 and a casing 26 supporting the propeller 27. The planet carrier 23 supports three planet gear wheels 28, only one of which can be seen, and each planet gear wheel 28 meshes with a common sun gear wheel 29 and a common annulus gear wheel 30 drivingly fast with a power output shaft 31 from the overdrive gearing. The overdrive gearing is the subject of our U.S. Pat. Specification No. 3,164,036 and its gear ratio is determined by the condition of the sun gear wheel 29 which can be locked by a movable friction-engaging member 32 optionally to the annulus gear wheel 30 under the action of compression coil springs 33 to provide the direct drive ratio, or to the casing 24 by the actuation of a nonrotatable piston 34 to provide the overdrive ratio. A further piston 35 is operable to engage a disc 36 axially fast with the friction-engaging member 32 so that the piston 34 can be disengaged from the friction-engaging member 32 before the latter engages the annulus gear wheel 30. The outboard unit is arranged to be clamped to the stern of a boat by a fixing screw 37. The power output shaft 31 extends vertically downwards into the casing 26 to drive unshown bevel gears for transmitting drive to the propeller 27 which is supported for rotation about a horizontal axis.

Figure 3:
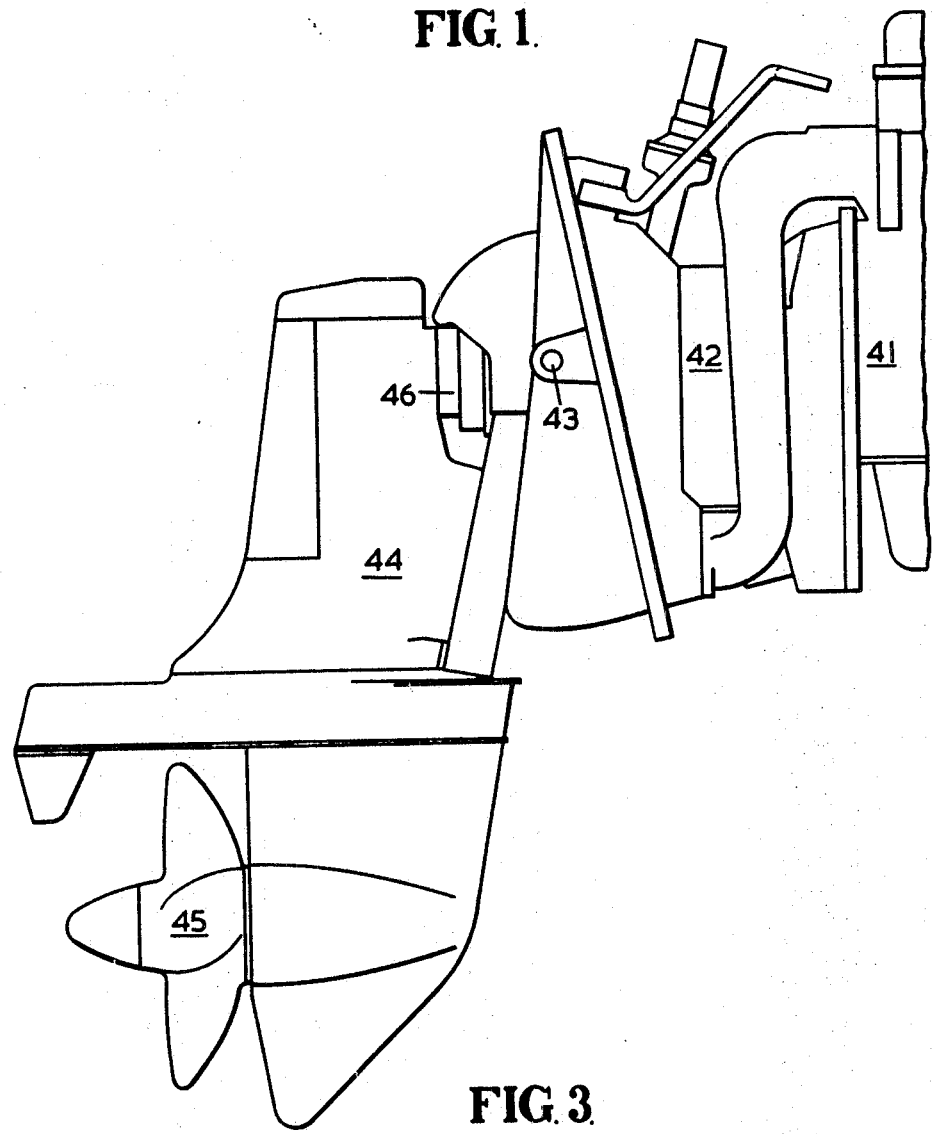
FIG. 3 is a side elevation of a stern-drive boat propulsion unit.

With reference to FIG. 3 a stern drive boat propulsion unit comprises a prime mover 41 having an unshown horizontal power output shaft arranged to drive an overdrive epicyclic gearing which is of the same type illustrated in FIG. 2 and is disposed within a casing 42 so that its power output shaft is also horizontal and is connected to drive an unshown universal joint having its centre of articulation lying on the transverse horizontal axis of a pivot 43 carrying a casing 44 supporting the propeller 45. From the universal joint a drive shaft extends through a tubular housing 46 into the casing 44 where a first set of bevel gears transfers the drive to the top of a vertical drive shaft having its bottom end connected to drive the propeller 45 through a second set of bevel gears.

Although an overdrive epicyclic gearing of specific form has been illustrated in both FIGS. 2 and 3, it may, if desired, be replaced by other forms of overdrive or underdrive epicyclic or other gearings.

If desired the piston 35 shown in FIG. 2 may be actuated to operate the disc 36 to a position in which the epicyclic gearing is in a neutral condition. In this manner the prime mover 21 can be disconnected from the propeller 27 whilst it is being started. The fluid pressure for operating the pistons 34 and 35 can be obtained either from a lubricant pump or an air pump driven by the prime mover 21, or can be in the form of compressed air from a pressure vessel.

I claim:

1. A boat hull, of the kind which requires less propulsive power at its minimum planing speed than is required at a lower speed, provided with a propulsion system comprising a prime mover, a propeller, a change-speed gearing arranged between said prime mover and said propeller, said change-speed gearing providing two alternative forward drive ratios between the prime mover and the propeller, wherein the improvement comprises said change-speed gearing providing a power gear change from a lower forward drive ratio to a higher forward drive ratio with substantially no interruption of power, the lower of said forward drive ratios being for engagement at sub-planing speeds whereby the prime mover can apply optimum power to the propeller for accelerating the hull to at least its minimum planing speed, and the higher of said forward drive ratios being for engagement when the hull has achieved a planing speed whereby the prime mover can be operated at reduced rotational speed and reduced power output whilst still driving the propeller at a sufficient rotational speed to maintain the hull at a planing speed.

2. A boat hull, as in claim 1, in which said change-speed gearing is an overdrive epicyclic gearing which provides a direct ratio constituting said lower forward ratio, and an overdrive epicyclic ratio constituting said higher forward ratio.

3. A boat hull, as in claim 2, in which the rotational speed/torque characteristic of the prime mover as applied to the propeller through the direct ratio of the overdrive epicyclic gearing is arranged to be compatible with the drag/speed characteristics of the hull at sub-planing speeds, and the overdrive ratio of the overdrive epicyclic gearing is selected to modify the application of the rotational speed/torque characteristic of the prime mover to the propeller to be compatible with the drag/speed characteristics of the hull at planing speeds.

4. A boat hull, as in claim 1, in which said change-speed gearing is an overdrive epicyclic gearing which provides a direct ratio constituting said lower forward ratio, and an overdrive epicyclic ratio constituting said higher forward ratio.

5. A boat hull, as in claim 4 in which the rotational speed/torque characteristic of the prime mover as applied to the propeller through the direct ratio of the overdrive epicyclic gearing is arranged to be compatible with the drag/speed characteristics of the hull at sub-planing speeds, and the overdrive ratio of the overdrive epicyclic gearing is selected to modify the application of the rotational speed/torque characteristic of the prime mover to the propeller to be compatible with the drag/speed characteristics of the hull at planing speeds.

6. A boat hull, as in claim 1, in which said change-speed gearing is an underdrive epicyclic gearing which provides an underdrive epicyclic ratio constituting said lower forward ratio, and a direct drive ratio constituting said higher forward ratio.

7. A boat hull, as in claim 6, in which the rotational speed/torque characteristic of the prime mover as applied to the propeller through the direct ratio of the underdrive epicyclic gearing is arranged to be compatible with the drag/speed characteristics of the hull at planing speeds, and the underdrive ratio of the underdrive epicyclic gearing is selected to modify the application of the rotational speed/torque characteristic of the prime mover to the propeller to be compatible with the drag/speed characteristics of the hull at sub-planing speeds.

8. A boat hull, as in claim 1, in which said change-speed gearing is an underdrive epicyclic gearing which provides an underdrive epicyclic ratio constituting said lower forward ratio, and a direct drive ratio constituting said higher forward ratio.

9. A boat hull, as in claim 8, in which the rotational speed/torque characteristic of the prime mover as applied to the propeller through the direct ratio of the underdrive epicyclic gearing is arranged to be compatible with the drag/speed characteristics of the hull at planing speeds, and the underdrive ratio of the underdrive epicyclic gearing is selected to modify the application of the rotational speed/torque characteristic of the prime mover to the propeller to be compatible with the drag/speed characteristics of the hull at sub-planing speeds.

10. A boat hull, as in claim 1, in which said change-speed gearing includes a reverse drive device to enable the hull to be manoeuvred at sub-planing speeds.

11. A boat hull, as in claim 1, including an outboard boat propulsion unit incorporating said prime mover together with said propeller and said change-speed gearing, and a casing for the change-speed gearing is secured to a casing of the prime mover and a casing supporting said propeller.

12. A boat hull, as in claim 1, including a stern-drive boat propulsion unit incorporating said prime mover together with said propeller and said change-speed gearing, and a casing for the change-speed gearing is secured to a casing of the prime mover and a casing supporting said propeller.